United States Patent [19]

Polushkin et al.

[11] Patent Number: 5,432,811
[45] Date of Patent: Jul. 11, 1995

[54] LASER ROD WITH POLYHEDRON SHAPED ENDS

[75] Inventors: Valeri G. Polushkin; Sergey A. Kokhanovsky, both of Moscow Region; Evgeny A. Federov, deceased, late of Moscow, all of Russian Federation, by Fedorova Lidia Vasilyevna, legal representative

[73] Assignee: Tecnal Products, Inc., Albuquerque, N. Mex.

[21] Appl. No.: 204,560

[22] Filed: Mar. 1, 1994

[51] Int. Cl.⁶ .............................................. H01S 3/06
[52] U.S. Cl. .................................... 372/66; 372/93
[58] Field of Search ................... 372/93, 94, 98, 103, 372/66

[56] References Cited

U.S. PATENT DOCUMENTS

| | | | |
|---|---|---|---|
| 3,500,240 | 3/1970 | Kessler | 331/94.5 |
| 3,530,397 | 9/1970 | Suzuki et al. | 331/94.5 |
| 3,538,453 | 11/1970 | Miller | 331/94.5 |
| 3,577,093 | 5/1971 | Simpson | 331/94.5 |
| 3,602,724 | 8/1971 | Smith | 307/88.3 |
| 3,639,855 | 2/1972 | Dillon, Jr. et al. | 331/94.5 |
| 3,654,482 | 4/1972 | Massey | 307/88.3 |
| 3,660,779 | 5/1972 | Cuff et al. | 334/94.5 |
| 3,680,000 | 7/1972 | Chesler et al. | 331/94.5 |
| 4,575,854 | 3/1986 | Martin | 372/75 |
| 4,641,912 | 2/1987 | Goldenberg | 350/96.10 |
| 4,648,892 | 3/1987 | Kittrell et al. | 65/4.21 |
| 4,712,537 | 12/1987 | Pender | 128/9 |
| 4,731,795 | 3/1988 | Clark et al. | 372/107 |
| 4,740,047 | 4/1988 | Abe et al. | 350/96.15 |
| 4,797,896 | 1/1989 | Kane | 372/94 |
| 4,800,886 | 1/1989 | Nestor | 128/634 |
| 4,822,335 | 4/1989 | Kawai et al. | 604/20 |
| 4,848,323 | 7/1989 | Marijnissen et al. | 128/6 |
| 4,912,713 | 3/1990 | Langhans | 372/66 |
| 4,949,728 | 8/1990 | Brook | 128/760 |
| 4,955,377 | 10/1990 | Lennox et al. | 128/401 |
| 4,984,885 | 1/1991 | Ortiz, Jr. | 356/153 |
| 4,994,060 | 2/1991 | Rink et al. | 606/28 |
| 5,019,075 | 5/1991 | Spears et al. | 606/7 |
| 5,037,172 | 8/1991 | Hekman et al. | 385/31 |
| 5,048,044 | 10/1991 | Ireland | 372/66 |
| 5,057,099 | 10/1991 | Rink | 606/12 |
| 5,077,745 | 12/1991 | Aoshima et al. | 372/94 |
| 5,102,410 | 4/1992 | Dressel | 606/15 |
| 5,117,433 | 5/1992 | Tatsuno et al. | 372/66 |
| 5,165,418 | 11/1992 | Tankovich | 128/760 |
| 5,177,764 | 1/1993 | Nilsson | 372/66 |
| 5,255,275 | 10/1993 | Motegi | 372/29 |
| 5,290,273 | 3/1994 | Tan | 606/9 |
| 5,292,320 | 3/1994 | Brown et al. | 606/15 |
| 5,298,018 | 3/1994 | Narciso, Jr. | 604/21 |
| 5,298,026 | 3/1994 | Chang | 606/15 |
| 5,304,170 | 3/1994 | Greene | 606/9 |

FOREIGN PATENT DOCUMENTS 1928665 of 1970 Germany .
2011322 of 1971 Germany .
1026596 of 1966 United Kingdom .

OTHER PUBLICATIONS

U.S. Official Gazette entries for U.S. Pats. Nos. 5,124,997; 5,124,998; 5,124,999; 5,125,000; 5,125,001; 23 Jun. 1992, pp. 2642, 2643.

(List continued on next page.)

Primary Examiner—Rodney B. Bovernick
Assistant Examiner—Robert McNutt
Attorney, Agent, or Firm—Guy McClung

[57] ABSTRACT

A laser has been developed with an active laser element which, in certain aspects, employs no mirrors but instead has a lasant rod with ends formed to produce total or nearly total internal reflection and an output window surface at one end from which a laser beam exits the device. In one aspect a rod end or ends are formed in the shape of polyhedrons whose surfaces reflect oscillating radiation. Also disclosed is a laser with an active laser emitter with a lasant rod with a first end formed in the shape of a polyhedron and a second flat end adjacent to or in contact with a plate or plates of solid reflective, coated or uncoated material, which are next to each other or spaced apart by spacer apparatus, e.g. rings. Such a laser emitter may be used in a laser device without other mirrors or reflectors.

15 Claims, 3 Drawing Sheets

OTHER PUBLICATIONS

"Attention? New Laser Perforator NTEC-303," Mammology, Jan. 1993 (w/translation).

"A Needle Without A Needle, A Finger Stick Without Sticking A Finger . . . ," Tekhnika-Molodezh; Engineering for Youth, Deck. 1993 (w/translation).

"New In Laser Medicine and Surgery," USSR State Committee On Science and Technology, USSR Ministry of Health, Moscow, 1990 (w/translation).

"Int'l Conference New In Laser Medicine," Moscow, 1991 (w/translation).

"Annual Accounting By The USSR Academy of Sciences," 1991 (w/translation of 10th paragraph).

"Information Bulletin," All Union Scientific Research Institute of Patent Information, Moscow, 1991.

"Ultraviolet Excimer Laser Ablation: The Effect of Wavelength And Repetition Rate On In Vivo Guinea Pig Skin," Journal of Investigative Dermatology, 1987.

"Ultraviolet-Laser Ablation of Skin," Arch Dermetol, 1985.

"Pulsed Photo Thermal Radiometry of Absorption Yag:Er and $CO_2$ Laser Radiation In Biological Tissues," Sov. Journal Quantum Electron. 1989.

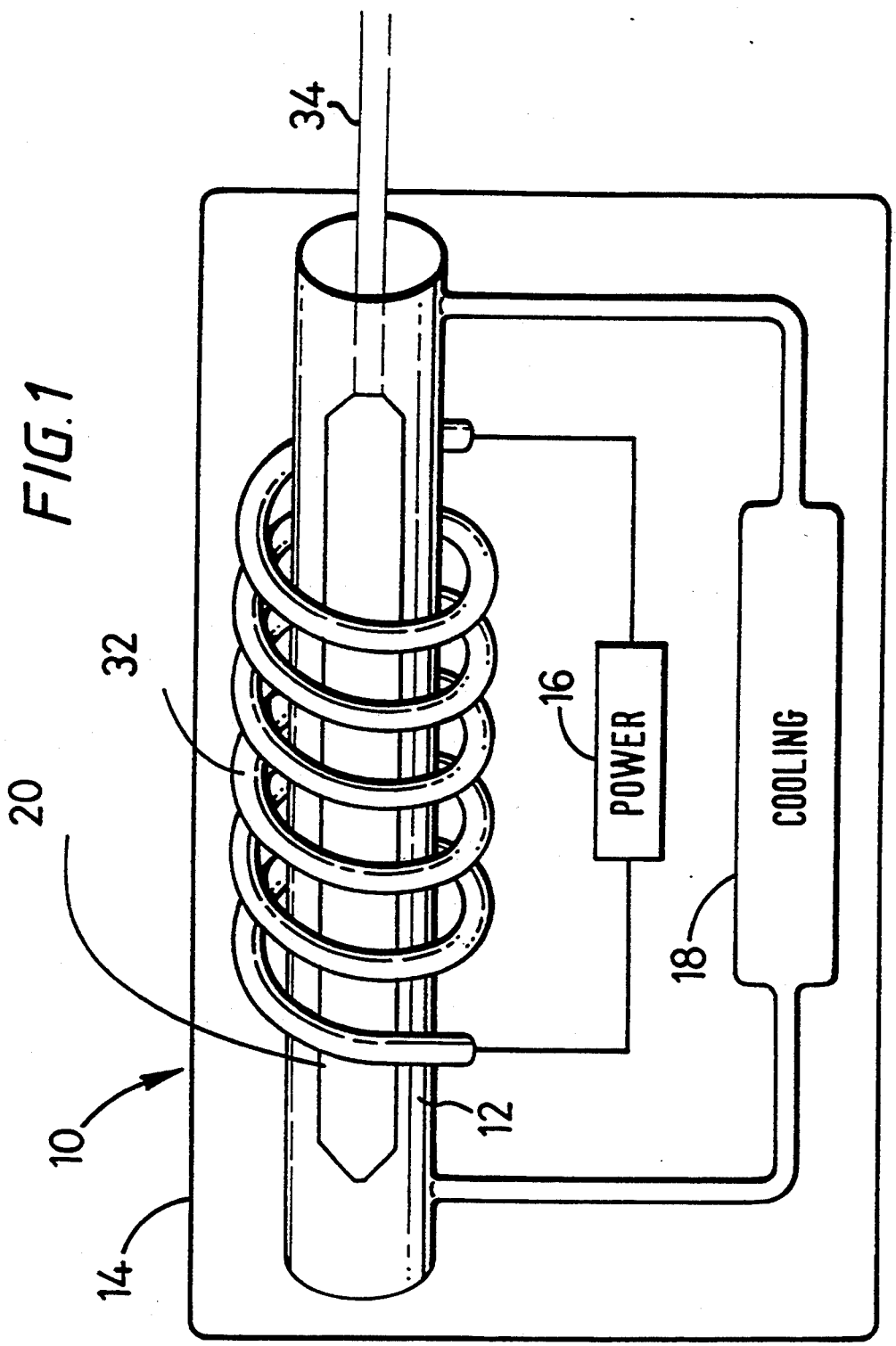

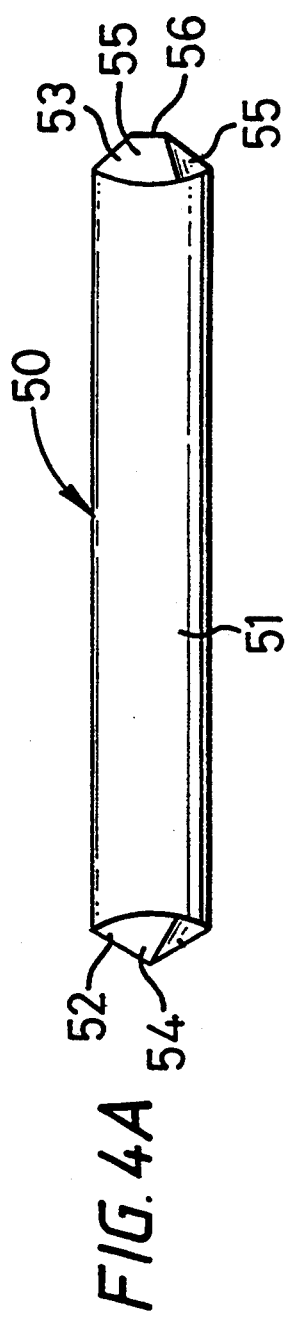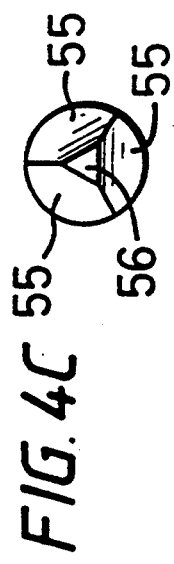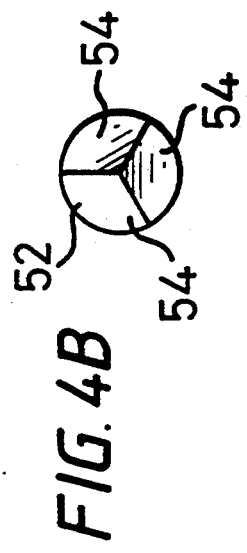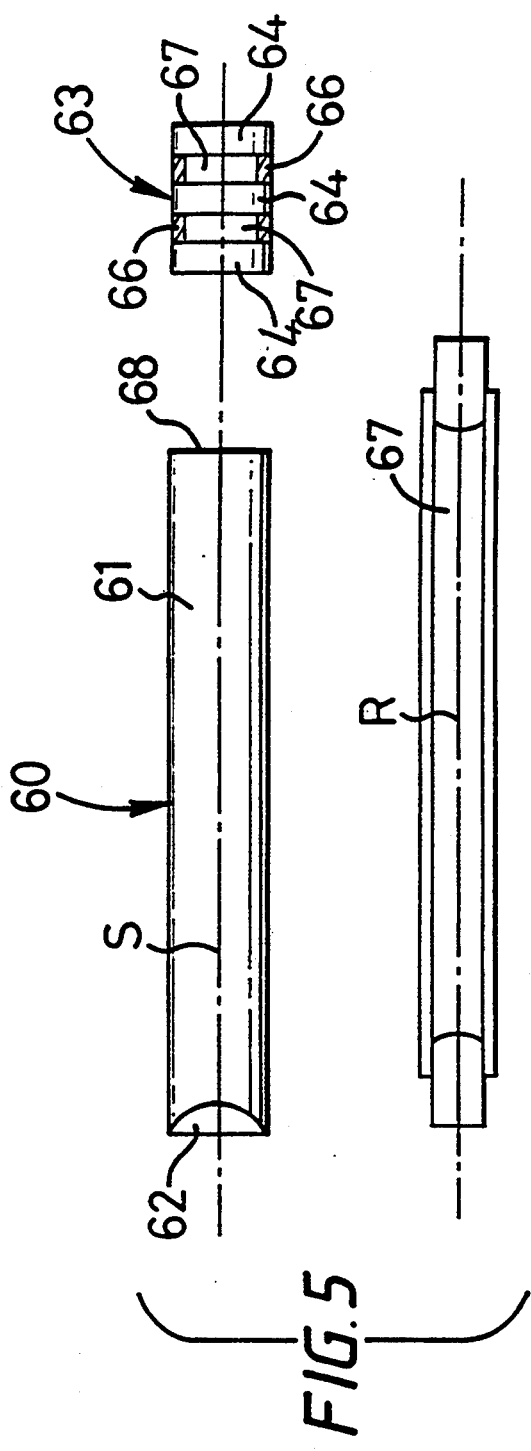

LASER ROD WITH POLYHEDRON SHAPED ENDS

BACKGROUND OF THE INVENTION

1. Field of the Invention

This invention relates to lasers and, in one aspect to a mirrorless laser.

2. Description of Related Art

Certain prior art lasers are made with expensive surface coating technologies and are assembled by skilled technicians with the need for precise adjustments. Certain prior art lasers use reflective surface coatings which wear out, especially when used with infrared laser wavelengths. Certain prior art lasers have mirrors which are adjusted to a precise alignment to function well. Such lasers often are not optimally useful in applications where there is need for high portability or long functional lifetimes. There has long been a need for a laser which overcomes these problems and disadvantages. There has long been a need for a laser which may be made without coatings and without adjustable parts so that the cost of assembly is greatly reduced, so that the ruggedness of products using the laser is improved, and so that the functional lifetime of laser devices using the design is extended as compared with certain commonly available laser devices.

A typical laser has a light source, a lasing material, and a set of reflectors, Most solid state laser are derived from the ruby laser design consisting of a rod of crystalline ruby material surrounded by a helically-formed, gas-filled, high intensity lamp, with mirrors placed a precise distance from, or in contact with, or coated onto, the surfaces of the ruby material. One mirror has either a hole or a reduced reflectance relative to the other. Light is injected from the lamp into the laser material initiating the discharge of photons from impurities in the crystal. These photons travel between the two mirrors producing a harmonic amplification. The amplified laser beam escapes the system through the hole or area of reduced reflectance. The ruby crystal can be replaced with various lasant materials to produce different wavelengths of laser light. These materials include yttrium-aluminum-garnet (YAG) which will include chemical impurities to modify the resultant wavelength of the laser. These traditional laser designs require the use of precisely made mirrored surfaces. These surfaces are generally created by coating the surfaces with a thin coating of reflective material. If separate mirrors are used, they must be placed precisely with respect to the optical axis of the laser rod, with respect to each other, and with respect to the desired output location of the device. If the mirrored surfaces are misaligned by handling of the device, the effective function, and efficiency of the device is decreased. The reflective mirror surfaces may also be produced by coating them onto the surface of a laser crystal. In each case, very expensive and highly complex machinery is required to create a smooth, homogeneous coating of controlled thickness. These coatings may be damaged by photochemical effects of continued exposure to the laser light, especially light of infrared wavelengths. This incremental damage reduces the effective lifetime of the laser.

SUMMARY OF THE PRESENT INVENTION

The present invention, in one embodiment, discloses a laser which has light pumping apparatus (e.g. but not limited to a flash lamp or xenon arc lamp) mounted in a housing (e.g. but not limited to a cylindrical tube with a reflective-material coated, e.g. silvered, interior surface) with the housing side-by-side with or adjacent to a laser element, e.g. a rod of material suitable for lasing ("lasant material"). A conventional power source provides power to the light pumping apparatus and conventional cooling apparatus may be used to provide any needed cooling of the assembly. In certain embodiments cooling is unnecessary. Light from the light pumping apparatus is directed to and into the rod.

In one embodiment the rod is fashioned with a roof prism at one non-emissive end and with a face perpendicular to a lateral axis of the rod at the other end. In another embodiment the roof prism is any polygonal shape having any number of faces intersecting at a vertex, including but not limited to a conical shape. In certain embodiments the emissive rod end is in the shape of a polyhedron (two or more sides) with a truncated end portion forming a window for an output laser beam.

In one embodiment one or more parallel plates of solid material are arranged at the emissive end of the laser rod. Each such plate has two faces. The reflectivity of each face depends on the reflective index of the material, but is preferably less than 100%. The plates are made, most preferably, such that the distance d between the faces of each plate is an odd multiple of $\frac{1}{4}$ of the fundamental wavelength of the lasant material satisfying the equation $d=(2N+1)\frac{1}{4}$, where n is an integer, and 1 is the fundamental wavelength of the laser. Plates satisfying these criteria are referred to as "$\frac{1}{4}$" plates. The distance between plates is also preferably equal to d so that light waves reflecting from the faces of the plates are reflected in phase with incident light waves, producing harmonic amplification of light travelling back and forth within the rod of lasant material. Rings (made e.g. of the same material as the plates, polytetrafluorethylene, aluminum or some material with a relatively low coefficient of thermal expansion) separate the plates and space them apart a desired distance. Thus lasant rods according to this invention comprise a laser cavity bounded by the rod ends and side(s).

The plates may be made of any material with a sufficiently high reflectance index. Glass, corundum, germanium, chromium, sapphire, and yttrium-aluminum-garnet (YAG), preferably with no impurities, are some common examples. The number of parallel faces in certain embodiments is chosen to achieve a desired total reflectance of the system.

Lasant rods according to this invention with a truncated polyhedron end and exit window for an output laser beam as described herein select for higher order light modes (sets of travelling light beams), modes which are at a greater angle to a rod's central optical axis than are lower order modes. Higher order mode laser beams are preferred in certain embodiments since they produce relatively wider and/or relatively shallower holes, e.g. when used to make a hole in the flesh of a living being to take a blood sample.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1 is a side schematic view of a laser system according to the present invention.

FIG. 4A is a side view of an active laser element according to the present invention.

FIG. 4B is an end view of one end of the element of FIG. 4A.

FIG. 4C is an end view of another end of the element of FIG. 4A.

FIG. 5 is a side schematic view of a laser system according to the present invention with a laser emitter according to the present invention.

DESCRIPTION OF EMBODIMENTS PREFERRED AT THE TIME OF FILING FOR THIS PATENT

Figure 2A:
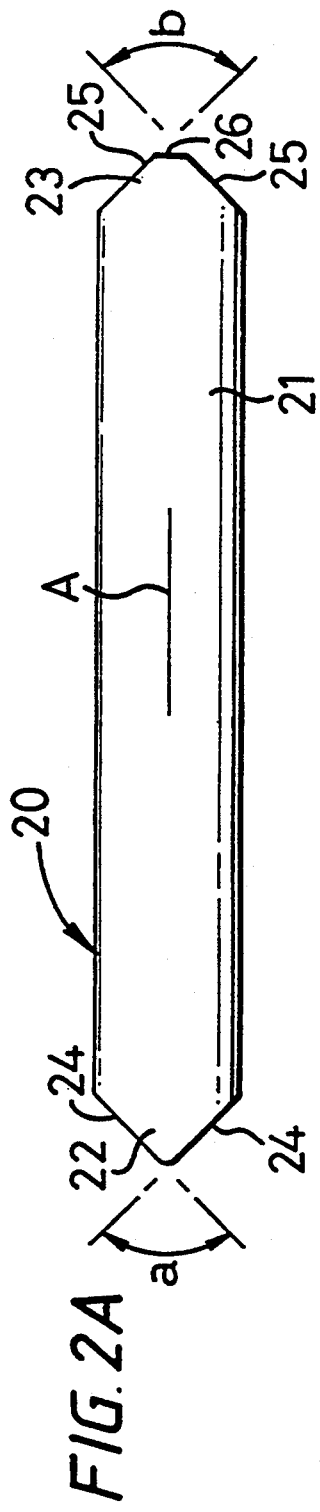
FIG. 2A is a side view of an active laser element according to the present invention.
Figure 2B:
FIG. 2B is an end view of one end of the element of FIG. 2A.
Figure 2C:
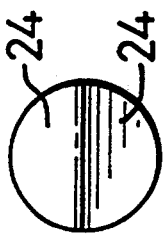
FIG. 2C is an end view of another end of the element of FIG. 2A.

Referring now to FIG. 1, a laser system 10 according to the present invention has a laser 12 mounted in a housing 14 and interconnected with a power source 16 and an optional cooling apparatus 18. The power source 16 provides power to a light pumping device such as a flash lamp 32 to produce stimulated emission of radiation (e.g. light) in an active laser element lasant rod 20 according to the present invention, producing a laser beam 34 which is directed from the housing 14.

FIGS. 2A, B, and C illustrate the lasant rod 20 which is made from appropriate lasant material. The rod 20 has a body 21 with a first end 22 and a second end 23. The first end 22 has two faces 24 which are at an angle a of ninety degrees with respect to each other and each at an angle of forty five degrees to a longitudinal axis A of the rod 20. The second end 23 of the rod 20 has two faces 25 which meet to truncate the rod end and form an end surface 26 which is a window for the laser beam 34 to exit the rod 20. The faces 25 are at an angle b of ninety degrees to each other and at an angle of forty five degrees to the axis A. In an alternate form the end 23 is a truncated cone with a circular exit window. The ends 22 and 23 are disposed and configured so that light (or other stimulated radiation) is internally reflected from end to end in the rod 20 and then exits the rod 20 as the output laser beam 34.

Figure 3A:
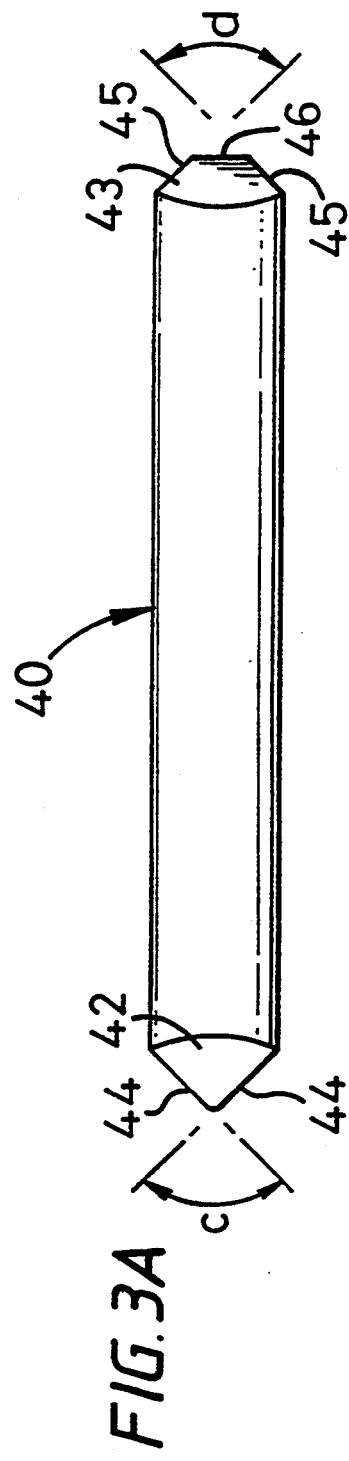
FIG. 3A is a side view of an active laser element according to the present invention.
Figure 3B:
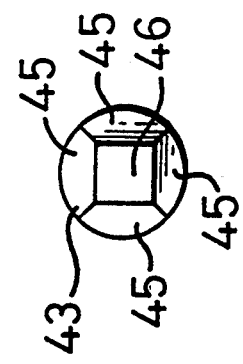
FIG. 3B is an end view of one end of the element of FIG. 3A.

FIGS. 3A, B, and C illustrate a lasant rod 40 which is an alternative to the rod 20. The rod 40 has a body 41 with a first end 42 and a second end 43. The first end 42 has four faces 44 which are at an angle c of ninety degrees with respect to each other and each at an angle of forty five degrees to a central longitudinal axis of the rod 40. The second end 43 of the rod 40 has four faces 45 which meet and truncate the rod end and form a rectangular or square end surface 46 which is a window for the laser beam 34 to exit the rod 40. The faces 45 are at an angle d of ninety degrees to each other and at an angle of forty five degrees to the central longitudinal axis of the rod. The ends 42 and 43 are disposed and configured so that light (or other stimulated radiation) is internally reflected from end to end in the rod 40 and then exits the rod 40 through the window 46 as an output laser beam.

Referring now to FIGS. 4A, B, and C a lasant rod 50 according to this invention has a body 51 with a first end 52 and a second end 53. The first end 52 has three faces 54. The second end 53 of the rod 50 has three faces 55 which meet to truncate the rod end and form a triangular end surface 56 which is a window for an output laser beam to exit the rod 50. The ends 52 and 53 are disposed and configured so that light (or other stimulated radiation) is internally reflected from end to end in the rod 50 and then exits the rod 50 through the window 56 as a laser beam.

It is most preferred that active laser elements (such as but not limited to the rods 20, 40, 50 previously described) according to the present invention have ends which are in the shape of polyhedrons (two or more sides; e.g. a ninety degree prism, a trihedron pyramid, a tetrahedron pyramid, a quintahedron pyramid, etc.) which effect nearly total or total internal reflection (preferably ninety percent or more, and most preferably one hundred percent total internal reflection) within a lasant rod and which have a truncated end which provides an exit window for an output laser beam. It is within this invention's scope for such rods to have any desired cross-section, e.g. but not limited to circular (cylindrical), rectangular, square, triangular, oval (elliptical), etc. In certain embodiments such an active laser element lasant rod is made of YAG doped with erbium in the shape of a cylindrical bar 120 millimeters long and 8 millimeters in diameter, with one end shaped as a two-sided prism, and another end shaped as a truncated prism to provide an output window (e.g. as in FIG. 2A); in another embodiment the rod is 105 millimeters long with a 6 millimeter diameter. In another embodiment such a rod is made from corundum doped with titanium or YAG doped with neodymium. With one such lasant rod used in a device as in FIG. 1, a laser beam is produced which is preferably one hundred percent reflected from the non-truncated polyhedron end and partially reflected from the truncated end so that oscillation is sustained.

Referring now to FIG. 5 a laser 60 is disclosed which may be used with various laser systems (e.g. but not limited to systems as shown in FIG. 1) and which is especially suited for laser units with an oscillation wavelength more than 2.5 micrometers, and in certain embodiments a wavelength of 2.5 to 5.0 micrometers. The laser 60 has an active crystal component bar 61 with a polyhedron end, e.g. prism end 62 (like the end 22, FIG. 2A), a pumping lamp 67 mounted adjacent the bar 62 and a reflecting element 63 mounted near or in contact with a flat end 68 of the bar 61. The reflecting element 63 has a set of two or more (three, four, five, six, etc.) parallel plane plates 64 (three shown, preferably ¼ plates) spaced apart by rings 66. In one embodiment the element 63 is about 5 millimeters in length; each plate is about 1 millimeter wide and each ring is about 1 millimeter wide. In one embodiment the plates 64 are made of corundum or YAG in the form of ¼ plates. Optionally each plate may have a reflecting surface. The bar 61 and plates 64 are centered on an axis S and an axis R of the lamp 67 is parallel to the axis S. Preferably with corundum plates, their reflecting surfaces are oriented in the 001 crystallographic direction to optimize reflectivity. Preferably with YAG plates their reflecting surfaces are oriented in the crystallographic 111 direction. The device renders unnecessary the adjustment of exterior reflecting elements at the prism end 62. In one embodiment an active crystal component lasant rod is made from erbium-doped YAG with four ¼ plates 64 made of monocrystal corundum or YAG, with crystallographic orientation of the plates chosen to provide stable oscillations within the lasant rod. Stimulated radiation is generated when the rod is exposed to light from the pumping lamp. In one aspect the prism end reflects all or nearly all of the oscillating radiation and the plates reflect about fifty percent of it while about fifty percent passes through them exiting the system as a laser beam. Preferred output beam radiation wavelengths for certain embodiments are in the range of 2.5 to 5.0 micrometers. In one aspect element service life is increased four times or more as compared to a device with two gold mirrors, one at each end (a 100% reflective gold mirror at one end of a rod with flat faces and a 50% reflective gold mirror at the other end).

In another embodiment of a laser such as the laser 60, a thick enough plate is used or sufficient number of solid uncoated reflective plates are used to achieve partial reflection so that no reflective coating is needed on any plate.

In one embodiment a laser rod made of erbium-doped YAG material has a non-emissive end of the rod ground and polished to form a two sided prism with a side intersection angle of 90 degrees. An emissive end of the rod is ground to a flat face perpendicular to a central axis of the rod. The lasant rod and a linear xenon arc lamp are positioned side-by-side in a tubular cavity. Four disc-shaped plates of undoped YAG are positioned parallel to the flat emissive face. Each face of the discs is cut in the crystallographic 001 orientation with a reflective index for each face of about 8% and thus for a plate of about 16% so that the total reflectance is theoretically 64%. In actual practice the reflectance for one such embodiment was found to be about 50% with the space between plates about 1 millimeter.

In an alternate design the emissive end of the laser rod was ground and polished with three facets intersecting at a vertex. A section of the vertex was cut to form a face perpendicular to the long axis of the rod. In this case the laser did not require external reflectors or components to achieve efficient function. The angular facets of the emissive end returned light to the non-emissive end which produced reflective amplification. After several passes through the laser cavity formed by the rod side and faceted ends of the crystal, the beam tends toward the center of the rod and is emitted from the cavity.

Figure 3C:
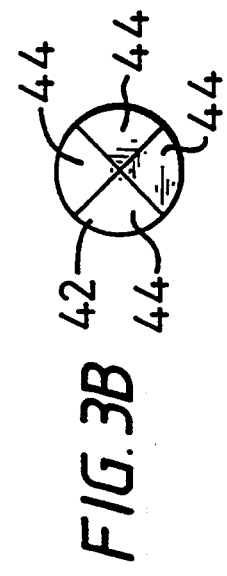
FIG. 3C is an end view of another end of the element of FIG. 3A.

In certain preferred embodiments the radius of an exit window for an output laser beam (e.g. in a rectangular window the distance from a center of the window to a corner point of the rectangular, a radius for a circular window, or the distance from a center of a polygonal window to one corner point thereof) is in the range of about five percent to about seventy five percent of the radius of the rod on which the window is located and in certain most preferred embodiments between about ten percent to about twenty five percent; and in one embodiment of a rod like that in FIG. 3C, about fifty percent is preferred.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized.

What is claimed is:

1. An active laser element lasant rod comprising
   a body of lasant material having a first end and a second end spaced apart from the first end,
   the first end shaped for internally reflecting light therefrom, the first end shaped as a non-emissive prism which is a polyhedron with at least three sides,
   the second end shaped for internally reflecting light therefrom and having an exit window portion for the exit of an output laser beam from the lasant rod, the second end shaped as a truncated polyhedron with at least three sides with the exit window portion formed thereof,
   the lasant rod having a radius and the exit window portion having a dimension from its center to a corner point thereof, the dimension of the window equalling between about five percent to about seventy five percent of the radius of the lasant rod, and
   the first end and the second end each shaped so that at least ninety percent internal reflection is achieved in the lasant rod.

2. The lasant rod of claim 1 wherein the window dimension is about ten percent to about twenty five percent of the radius of the lasant rod.

3. The lasant rod of claim 1 wherein the exit window portion selectively radiates higher order modes of an output laser beam.

4. The lasant rod of claim 1 wherein total internal reflection is achieved.

5. The rod of claim 1 combined in a combination with a laser emitter element for disposition adjacent the second end of the rod, the laser emitter element comprising
a plurality of parallel plates spaced apart from each other, each plate having a first face and a second face spaced apart from the first face, each face reflecting a portion of a beam emitted from the second end of the rod back into the rod and each face transmitting a portion of said beam away from the rod.

6. The combination of claim 5 further comprising
a spacer ring disposed between each two plates of the plurality of parallel plates.

7. The combination of claim 5 wherein the plates are coated on at least one side with a reflective coating.

8. The combination of claim 5 wherein the plates are uncoated.

9. The combination of claim 5 wherein the plates are made from glass, sapphire, YAG, germanium corundum, or chromium.

10. The combination of claim 5 wherein the plates reflect about 16% of incident light.

11. The combination of claim 5 wherein the output laser beam as a wavelength of 2.5 to 5.0 micrometers.

12. The combination of claim 5 wherein the plates are $\frac{1}{4}$ where l is the fundamental wavelength of the laser.

13. The combination of claim 12 wherein each adjacent pair of plates is spaced apart a distance d by a spacer ring, where $$d = (2N+1)\frac{l}{4}$$

and
n is an integer, and
l is a fundamental wavelength of the laser.

14. The combination of claim 5 wherein the lasant rod has a nonemissive prism end that reflects nearly all incident light back into the lasant rod and the plates reflect about fifty percent of incident light back into the lasant rod and about fifty percent of the incident light is transmitted by the plates away from the lasant rod.

15. The combination of claim 5 wherein each spacer ring is made from polytetrafluoroethylene or aluminum.

* * * * *